(12) United States Patent
Weiser et al.

(10) Patent No.: US 9,950,728 B2
(45) Date of Patent: Apr. 24, 2018

(54) COLLAPSIBLE TABLE

(71) Applicant: Knoll, Inc., East Greenville, PA (US)

(72) Inventors: Allan Weiser, New York, NY (US); Michael David Beltz, West Seneca, NY (US); Adam Joseph Kessler, Spencerport, NY (US); Conrad M. Marini, Woodbridge (CA)

(73) Assignee: KNOLL, INC., East Greenville, PA (US)

( * ) Notice: Subject to any disclaimer, the term of this patent is extended or adjusted under 35 U.S.C. 154(b) by 0 days.

(21) Appl. No.: 14/991,791

(22) Filed: Jan. 8, 2016

(65) Prior Publication Data

US 2016/0198841 A1 Jul. 14, 2016

Related U.S. Application Data

(60) Provisional application No. 62/159,166, filed on May 8, 2015, provisional application No. 62/159,152, filed on May 8, 2015, provisional application No. 62/101,322, filed on Jan. 8, 2015.

(51) Int. Cl.
| | |
|---|---|
| B62B 3/04 | (2006.01) |
| A47B 3/08 | (2006.01) |
| B62B 3/10 | (2006.01) |
| B65G 67/02 | (2006.01) |
| A47B 13/00 | (2006.01) |
| A47B 13/02 | (2006.01) |

(52) U.S. Cl.
CPC .............. *B62B 3/04* (2013.01); *A47B 3/0803* (2013.01); *A47B 3/0815* (2013.01); *A47B 13/003* (2013.01); *A47B 13/021* (2013.01); *B62B 3/108* (2013.01); *B65G 67/02* (2013.01); *A47B 2003/0806* (2013.01)

(58) Field of Classification Search
CPC ..... A47B 3/00; A47B 3/002; A47B 2003/006; A47B 2003/0806
USPC .................................................. 108/122, 115
See application file for complete search history.

(56) References Cited

U.S. PATENT DOCUMENTS

| | | | | |
|---|---|---|---|---|
| 1,259,580 | A | * | 3/1918 | Wurz ............................. 108/115 |
| 1,668,282 | A | | 5/1928 | Moore et al. |
| D80,586 | S | * | 2/1930 | Thomas ........................ 108/115 |

(Continued)

FOREIGN PATENT DOCUMENTS

| | | |
|---|---|---|
| CH | 240961 | 2/1946 |
| DE | 35067 | 5/1886 |
| EP | 0613637 | 9/1994 |

*Primary Examiner* — Jose V Chen
(74) *Attorney, Agent, or Firm* — Dorsey & Whitney LLP

(57) ABSTRACT

Disclosed is a collapsible furniture article. The collapsible furniture article comprises a horizontal support surface that articulates about a main support between an extended position and a collapsed position with respect thereto. A first primary leg is connected to the main support pivotally between an extended position and a collapsed position with respect thereto. A first secondary leg is pivotally connected to the first primary leg pivotally between an extended position and a collapsed position with respect thereto. The legs in the extended position are disposed to support the horizontal support surface in a horizontal position. In collapsed position, the primary legs are positioned between the collapsed support horizontal surface and the collapsed secondary legs.

22 Claims, 20 Drawing Sheets

(56) References Cited

U.S. PATENT DOCUMENTS

| | | | | |
|---|---|---|---|---|
| 1,793,709 A * | 2/1931 | Meyers | ............... | F16B 12/48 |
| | | | | 108/157.16 |
| 1,800,685 A * | 4/1931 | Griffis | ............... | A47B 3/02 |
| | | | | 108/159.11 |
| 1,998,519 A * | 4/1935 | Odenwald | ............... | A47B 3/02 |
| | | | | 108/11 |
| 2,791,477 A * | 5/1957 | Wesbecher | ............... | A47B 3/0803 |
| | | | | 108/11 |
| 2,860,020 A | 11/1958 | Nickliss et al. | | |
| 3,080,193 A * | 3/1963 | Nimmo | ............... | A47B 3/14 |
| | | | | 108/100 |
| 3,188,158 A | 6/1965 | Sanchez | | |
| 3,561,376 A | 2/1971 | Knoblock | | |
| 3,722,702 A * | 3/1973 | Marker, Jr. | ............... | A47F 5/13 |
| | | | | 108/115 |
| 3,805,710 A | 4/1974 | Leshem | | |
| 4,099,469 A | 7/1978 | Sahli | | |
| 5,205,223 A * | 4/1993 | Ball | ............... | A47B 3/0803 |
| | | | | 108/115 |
| 5,927,214 A * | 7/1999 | Schwartz | ............... | A47B 3/0815 |
| | | | | 108/115 |
| 6,082,838 A * | 7/2000 | Bissu-Palombo | ............... | A47B 3/12 |
| | | | | 108/115 |
| 6,164,217 A | 12/2000 | Prendergast | | |
| 6,637,352 B1 * | 10/2003 | Thode | ............... | A47B 3/08 |
| | | | | 108/115 |
| 6,845,723 B2 * | 1/2005 | Kottman | ............... | A47B 3/00 |
| | | | | 108/115 |
| 7,765,938 B2 * | 8/2010 | Piretti | ............... | A47B 7/02 |
| | | | | 108/115 |
| 8,069,795 B1 * | 12/2011 | Williams | ............... | A47B 3/00 |
| | | | | 108/115 |
| 8,091,488 B2 * | 1/2012 | Chirea | ............... | A47B 3/08 |
| | | | | 108/115 |
| 8,171,863 B2 * | 5/2012 | Nyenhuis | ............... | A47B 5/00 |
| | | | | 108/115 |
| 8,291,830 B2 * | 10/2012 | Rutz | ............... | A47B 3/0818 |
| | | | | 108/115 |
| 8,381,664 B2 * | 2/2013 | Prendergast | ............... | A47B 3/00 |
| | | | | 108/115 |

* cited by examiner

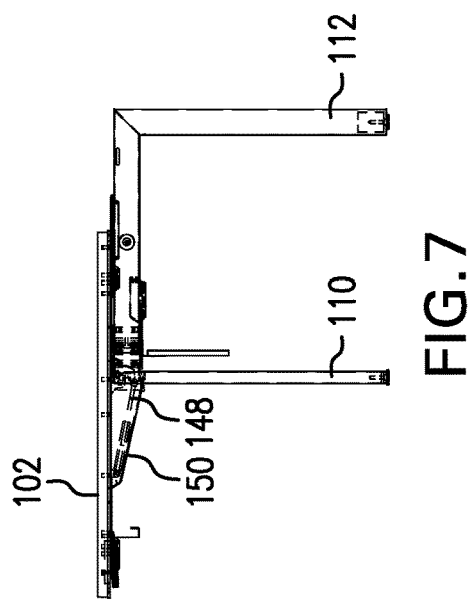
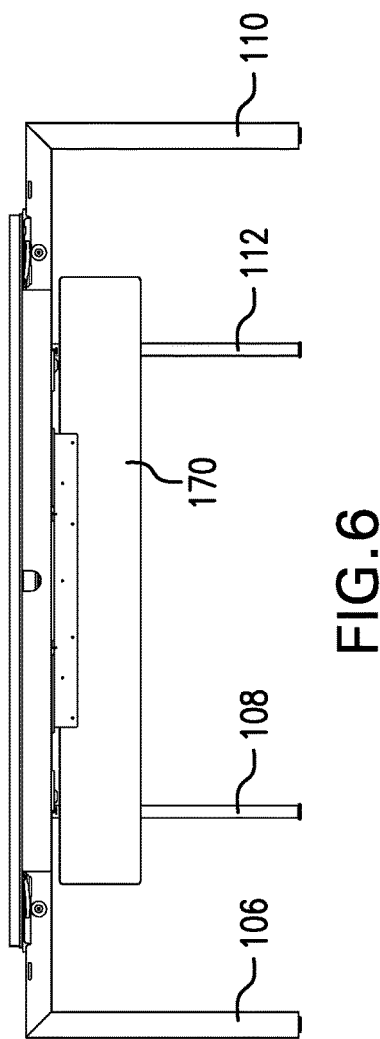

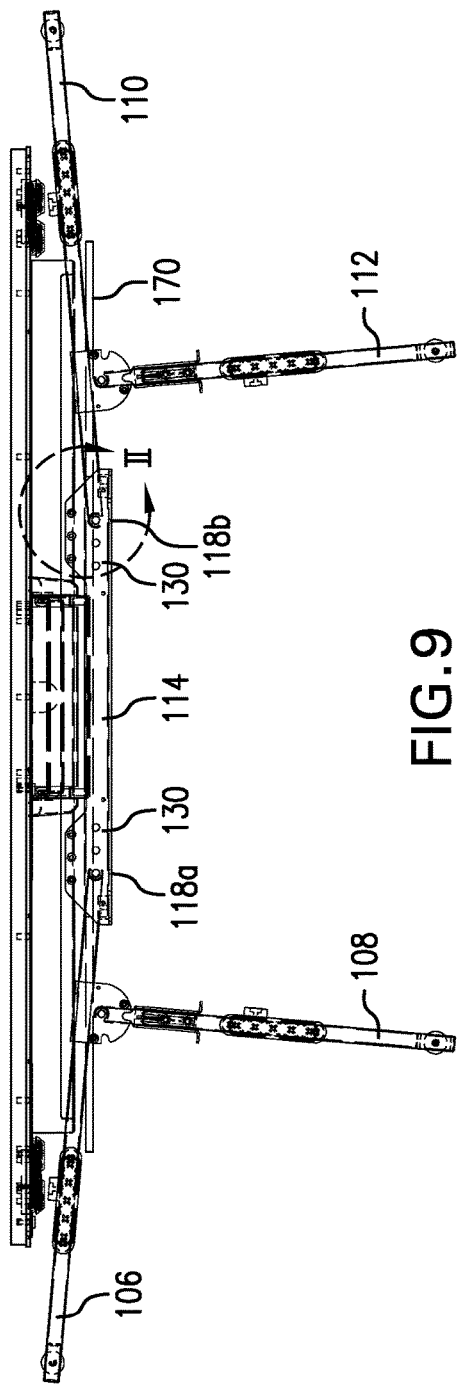
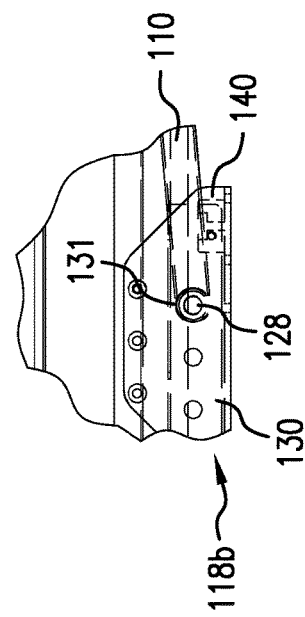
FIG. 9
FIG. 10

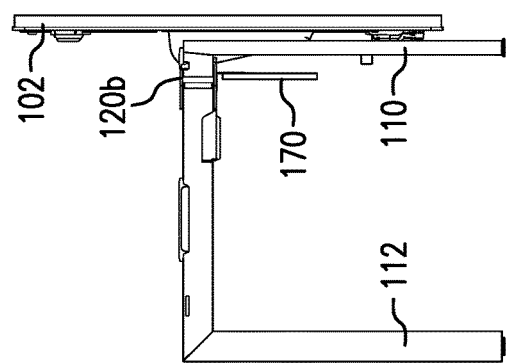
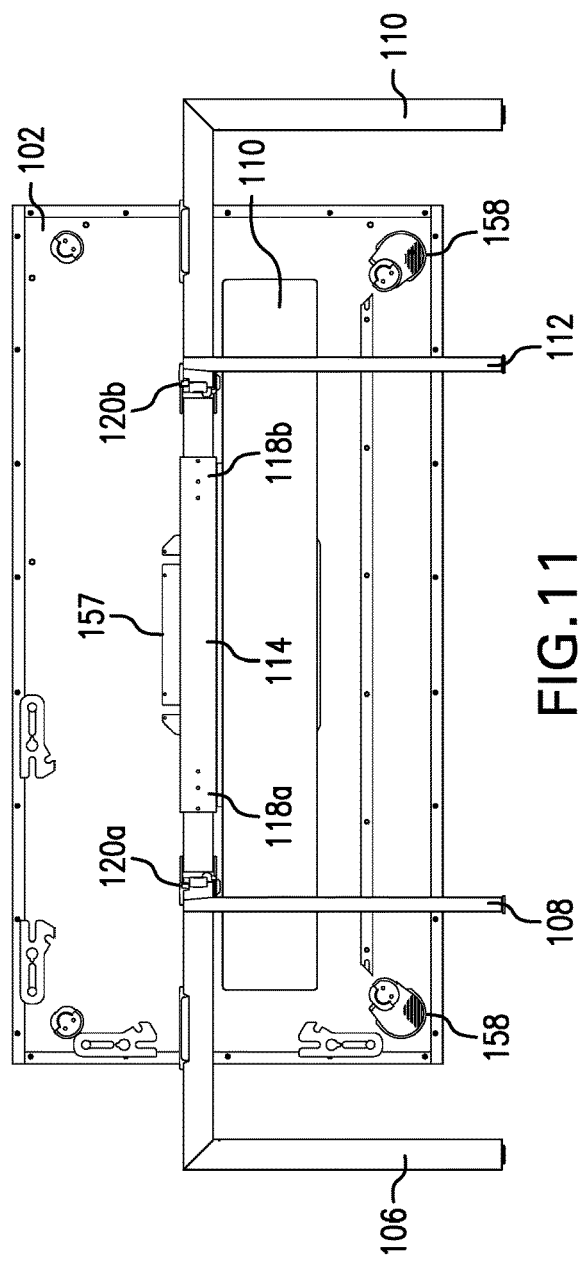

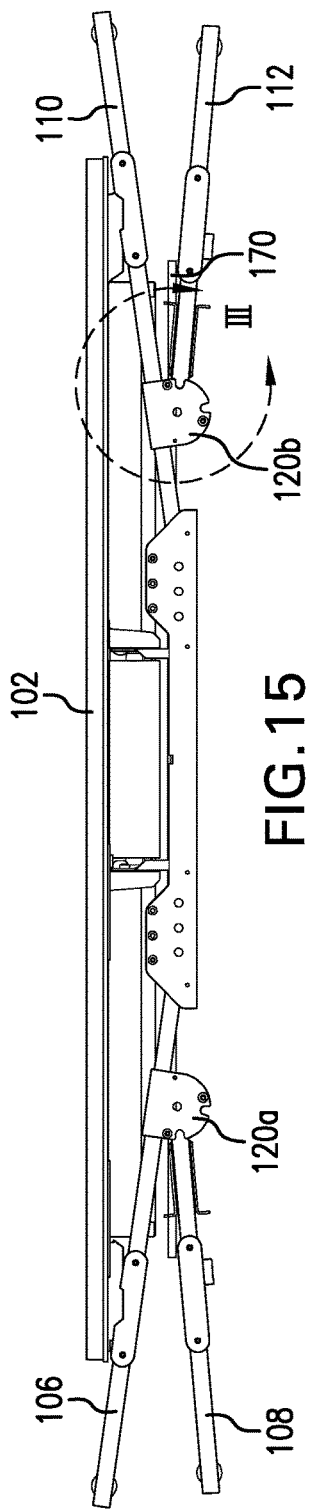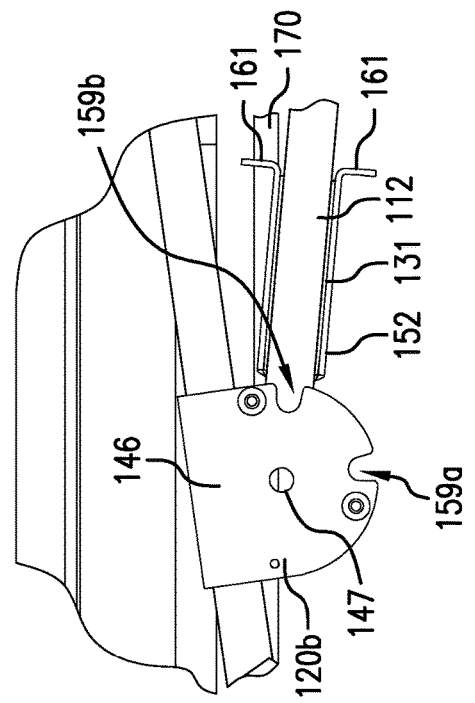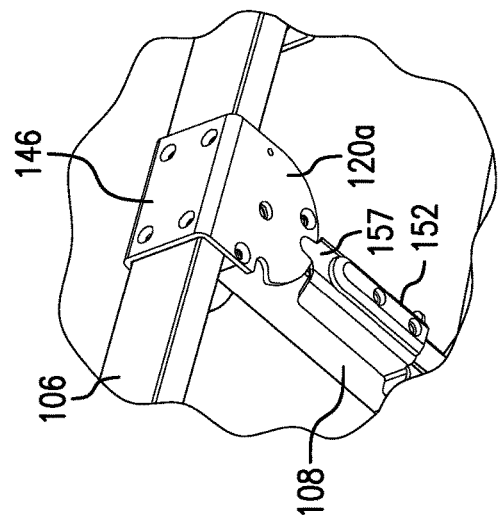

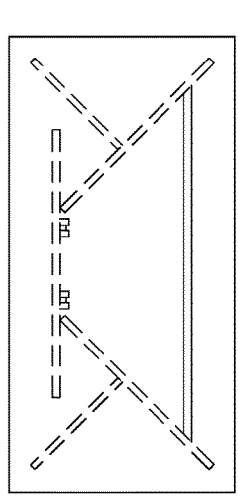 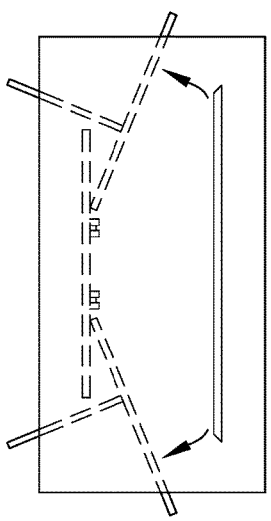 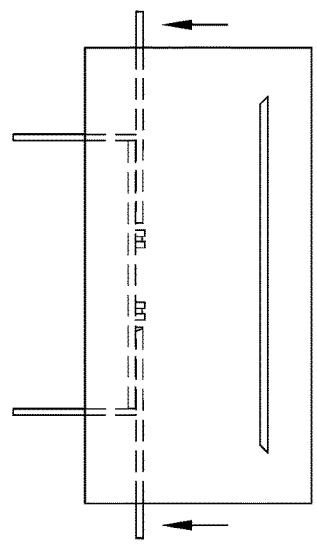
FIG.28A          FIG.28B          FIG.28C
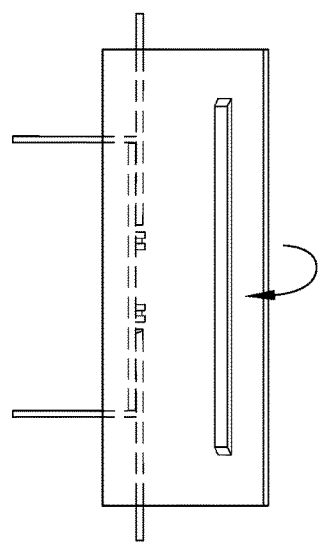 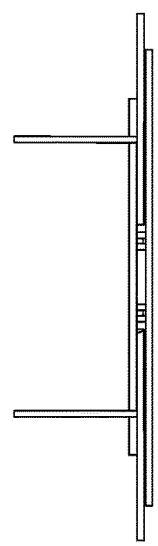 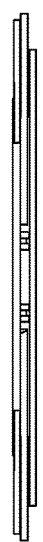
FIG.28D          FIG.28E          FIG.28F

COLLAPSIBLE TABLE

RELATED APPLICATIONS

The present application claims priority to U.S. provisional patent application No. 62/101,322, filed Jan. 8, 2015 "Collapsible Table", No. 62/159,152, filed May 8, 2015 entitled "Collapsible Table," and No. 62/159,166 filed May 8, 2015 entitled "Table Cart," all of which are incorporated herein by reference in their entireties. This application is with application Ser. No. 14/991,192 entitled "Table Cart," filed Jan. 8, 2016, which is also hereby incorporated by reference in its entirety.

FIELD

A collapsible table and related systems are described herein.

BACKGROUND

In order to compactly store tables when not in use, it is advantageous to allow the tables to collapse. Some attempts have been made to provide a collapsible table. For example, U.S. Pat. No. 6,164,217 discloses a table that has a table top that is hingedly connected to a frame, which includes a fixed portion and leg portions. These prior tables, however, are difficult to assemble and typically lack in structural stability.

SUMMARY

In some embodiments, disclosed is a collapsible furniture article. The collapsible furniture article comprises a horizontal support surface that articulates about a main support between an extended position and a collapsed position with respect thereto. A first primary leg is connected to the main support pivotally between an extended position and a collapsed position with respect thereto. A first secondary leg is pivotally connected to the first primary leg pivotally between an extended position and a collapsed position with respect thereto. The legs in the extended position are disposed to support the horizontal support surface in a horizontal position. In collapsed position, the primary legs are positioned between the collapsed support horizontal surface and the collapsed secondary legs.

BRIEF DESCRIPTION OF THE DRAWINGS

FIGS. 6 and 7 are front and side views of the collapsible table of FIG. 1;

FIG. 9 is a bottom view of the collapsible table of FIG. 1

FIG. 10 is a bottom view of a portion of the collapsible table of FIG. 1, shown in portion II of FIG. 9;

FIGS. 11 and 12 are rear and side views of the collapsible table of FIG. 1;

FIG. 15 is a top view of the collapsible table of FIG. 1

FIG. 16 is a portion of the collapsible table of FIG. 1, shown in portion I of FIG. 15;

FIG. 17 is a portion of the collapsible table of FIG. 1, shown in portion III of FIG. 15;

FIGS. 28A-28F are top views of the collapsible table of FIG. 26, as it is folded;

DETAILED DESCRIPTION

Figure 1:
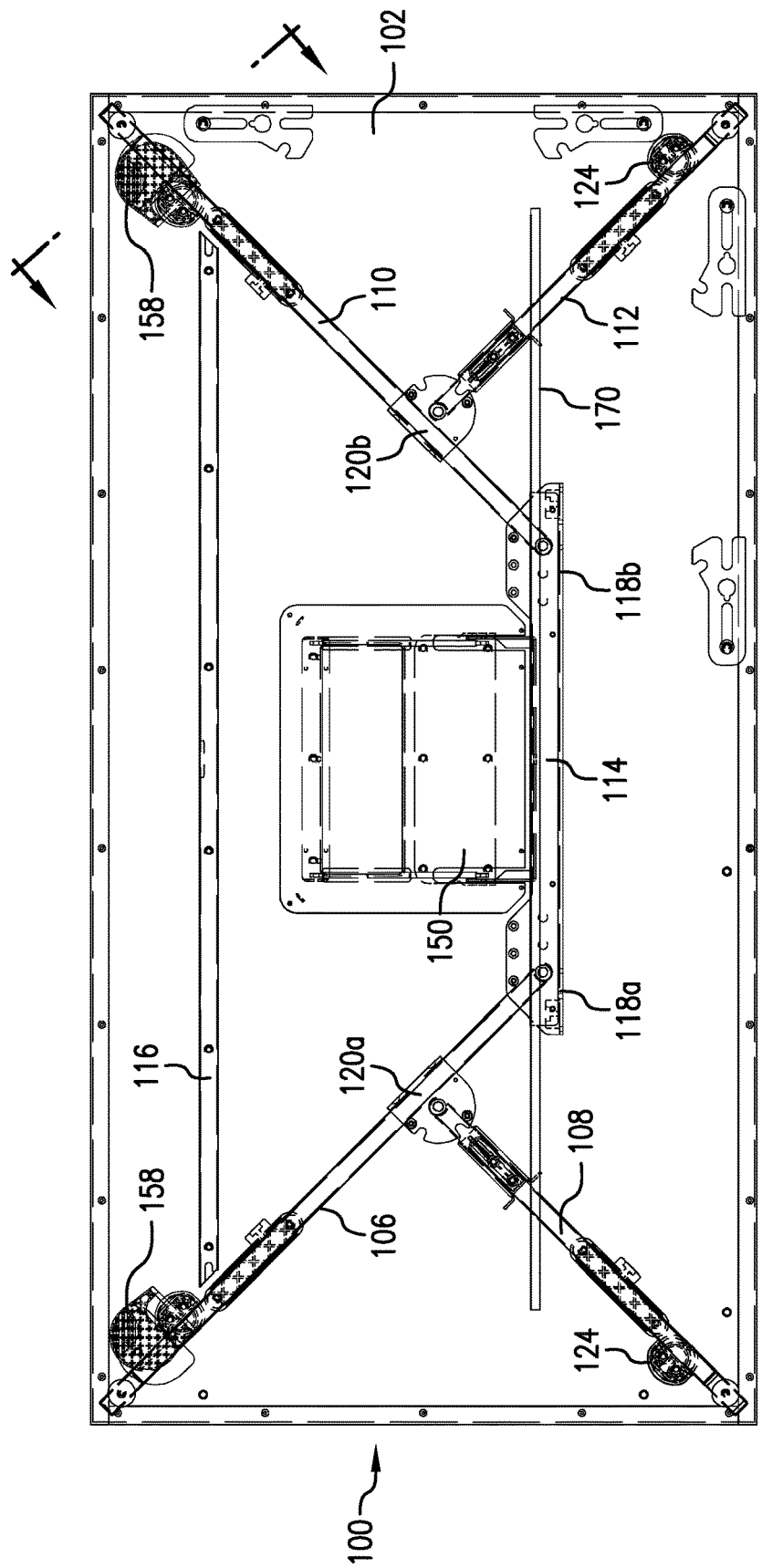
FIG. 1 is a bottom view of an embodiment of a collapsible table.
Figure 3:
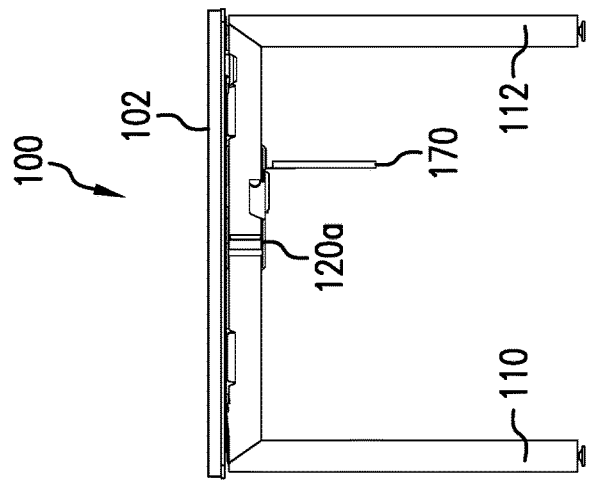
FIGS. 2 and 3 are rear and side views of the collapsible table of FIG. 1.
Figure 2:
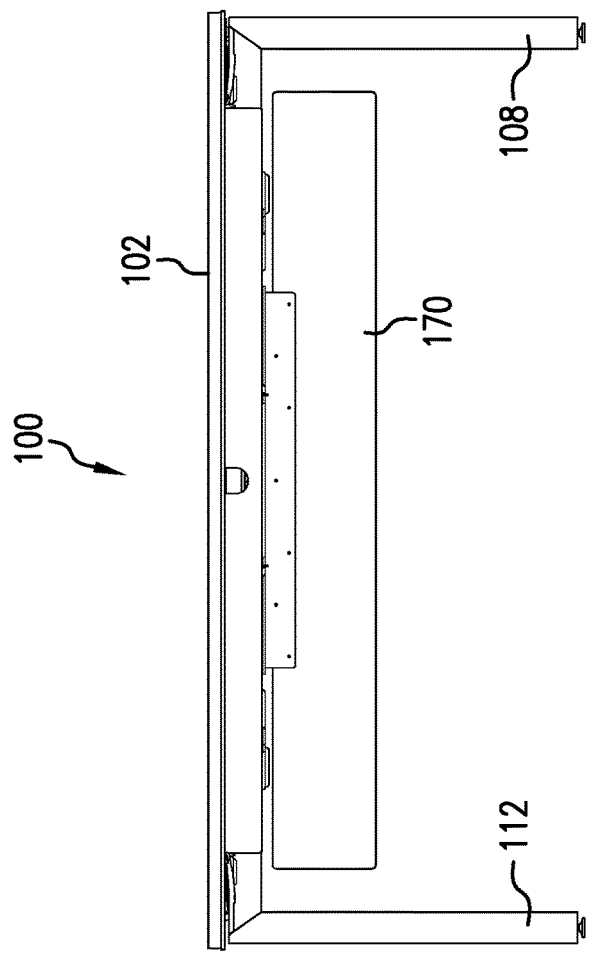

Provided is a collapsible furniture article that offers compact storage capabilities and improved structural stability.

FIGS. 1-23 show an embodiment of a collapsible table 100. The collapsible table 100 includes a tabletop 102 and a collapsible support 104. The tabletop 102 is articulable about the collapsible support 104, and the collapsible support 104 is foldable upon itself, so that the table 100 is reconfigurable between an extended position and a collapsed position. In the collapsed position, the table 100 occupies a smaller volume than in the extended position, to facilitate storage and handling. The table 100 is configured to allow a user to easily collapse, extend, and transport the table 100. The table 100 includes features for preventing unintended movement of its parts relative to one another and for improving its structural stability. The table 100 is configured to facilitate a user in loading and storing the table 100 onto a cart.

The collapsible support 104 includes a main support 114, first and second primary legs 106,110, and first and second secondary legs 108,112. The tabletop 102 is articulated to the main support 114. The primary legs 106,110 are articulated to the main support 114, and the secondary legs 108, 112 are articulated to the primary legs 108,112.

Articulations such as pivots allow components of the collapsible support 104 to collapse and expand, by pivoting, folding, or otherwise moving between desired positions. Other types of articulation that allow legs 106,108,110,112 to move under vertical load could be used. Preferably, the articulations are vertical hinges. More preferably, the articulations are vertical hinges (e.g., hinges, 118a, 118b, 120a, 120b) that move about a single axis of rotation.

Figure 4:
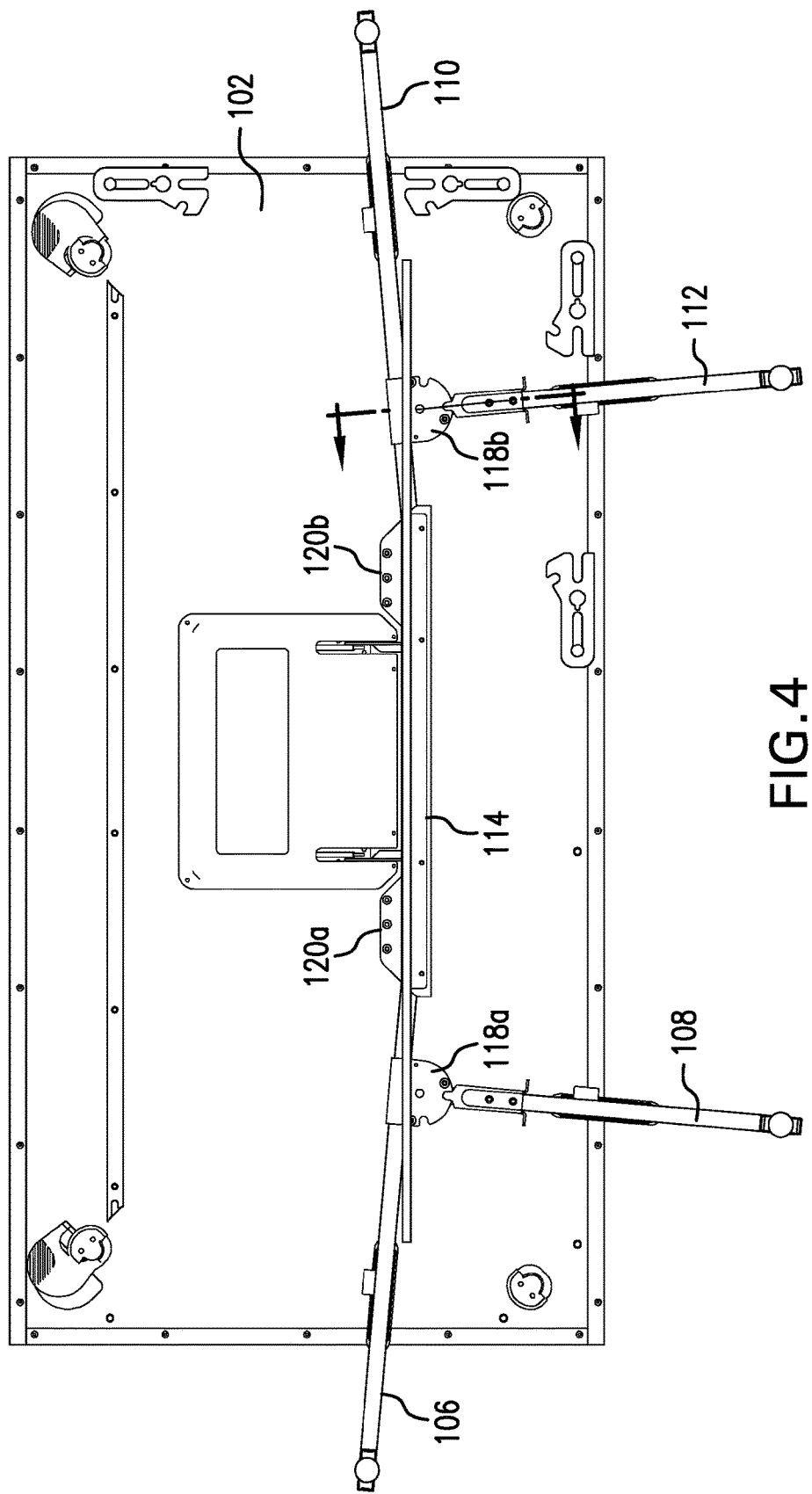
FIG. 4 is a bottom view of the collapsible table of FIG. 1.

First and second primary legs 106,110 are each pivotally attached to the main support 114 so that they can move between an extended position (FIG. 1) and a collapsed position (FIG. 4). The primary legs 106,110 are each articulated to the main support 114 via relative primary hinge 118a,118b. Thus each of the primary legs 106,110 is articulated to the main support 114 independently of the other.

Figure 14:
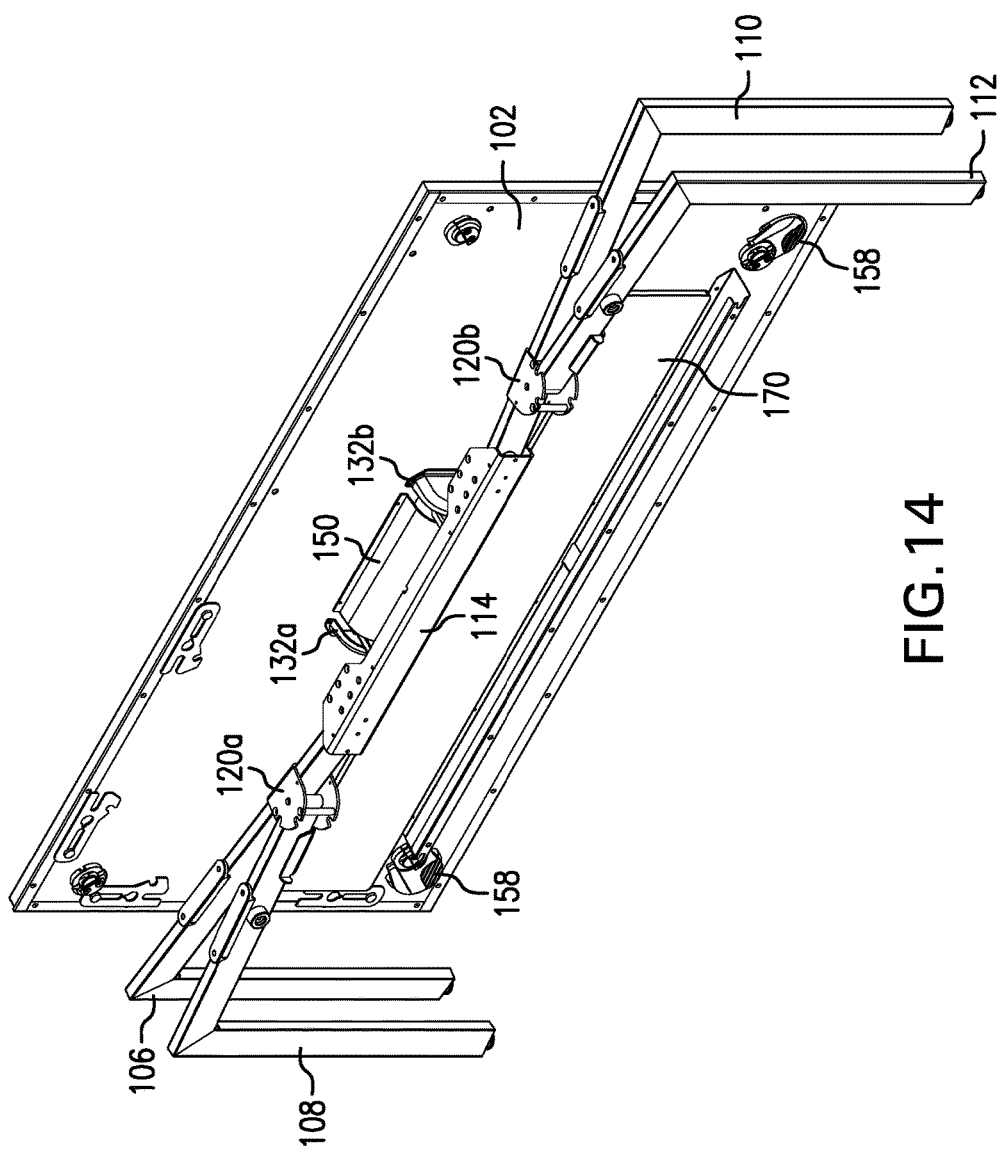
FIG. 14 is a rear perspective view of the collapsible table of FIG. 1

A secondary leg 108,112 is articulated to a primary leg 106,110 via a respective secondary hinge 120a,120b. Thus, each secondary leg 108,112 can articulate between an extended position (FIGS. 1 and 4) and a collapsed position (FIG. 14). The secondary hinges 120a, 120b are disposed inboard on the primary legs 106,110, so the secondary legs 108,112 and primary legs 106,110 are pivotally connected at a location that is along the length of the primary legs 106,100. The primary hinges 118a,118b may be disposed outboard of the primary legs 106,110 (e.g., proximate primary ends 138 of the primary legs 106, 11).

The table 100 is configured so that the tabletop 102 can remain in its extended, horizontal position while a user moves the primary legs 106,110 from their extended position (FIGS. 1-3) to their collapsed position (FIGS. 4-7). For example, as shown in FIGS. 4-7, the table 100 can be configured so that the tabletop 102 remains in its horizontal position while a user collapses one primary leg 106,110 and then collapses the other primary leg 106,110. In doing so, the secondary legs 108,112 remain in their extended position relative to the primary legs 106,110, so that the tabletop's 102 center of gravity remains between at least three of the feet. Thus, the tabletop 102 does not tip on its own, and a single user can easily collapse and extend the table 100.

Also shown in FIGS. 4-7, when the primary legs 106,110 are collapsed and the secondary legs 108,112 are extended, a user can grip or otherwise engage the secondary legs 108,112 and move (e.g., via wheels) the table 100 to a storage location. Then when the table 100 is the storage location, the user can articulate the tabletop 102 relative the main support 114, to the tabletop's collapsed position (FIGS. 8-13), and then articulate the secondary legs 108,112 relative to the primary legs 106,110 via hinges 120a,120b, to the secondary legs' 108,112 collapsed position (FIGS. 14 and 15).

Figure 5:
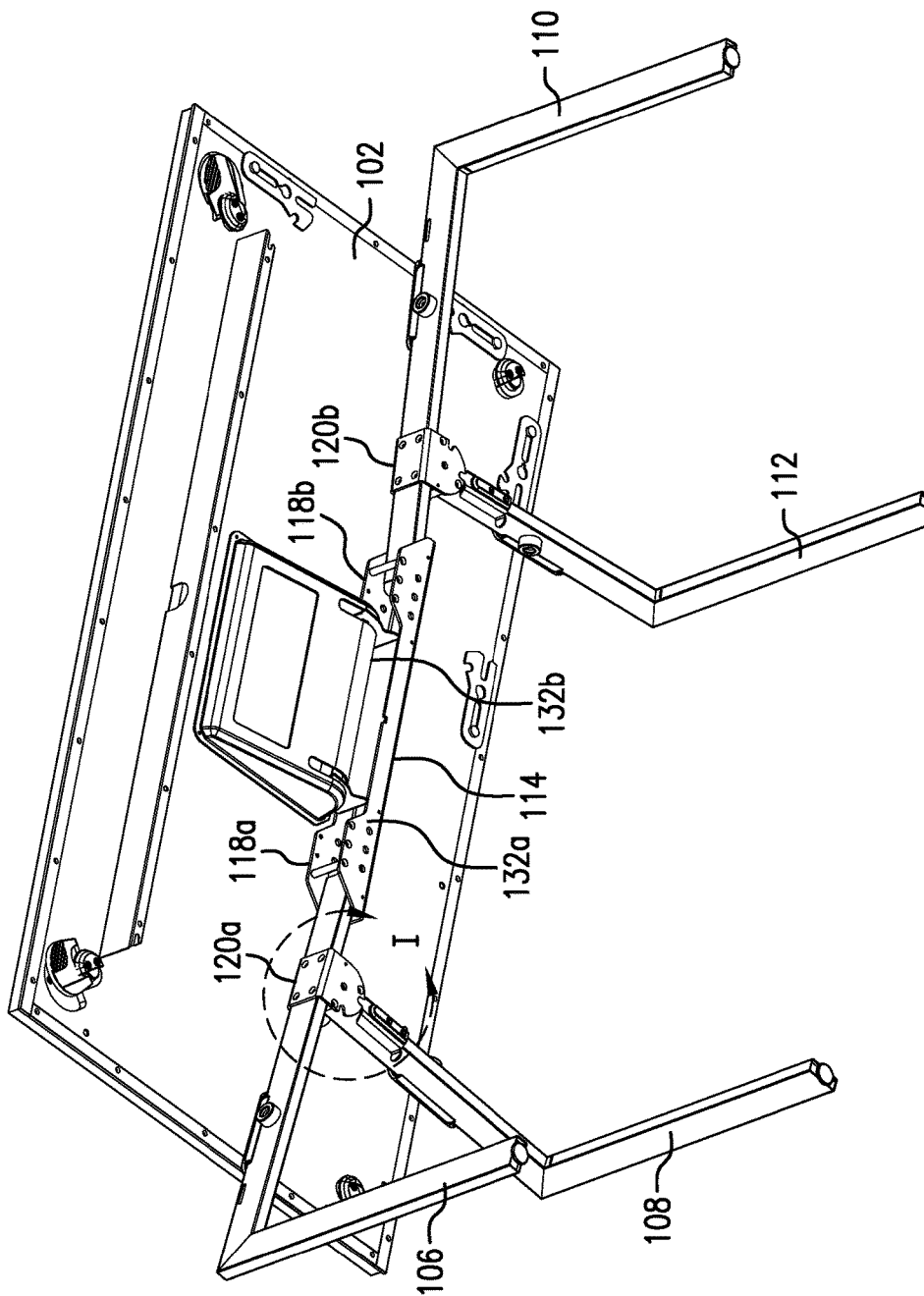
FIG. 5 is a bottom perspective view of the collapsible table of FIG. 1.
Figure 8:
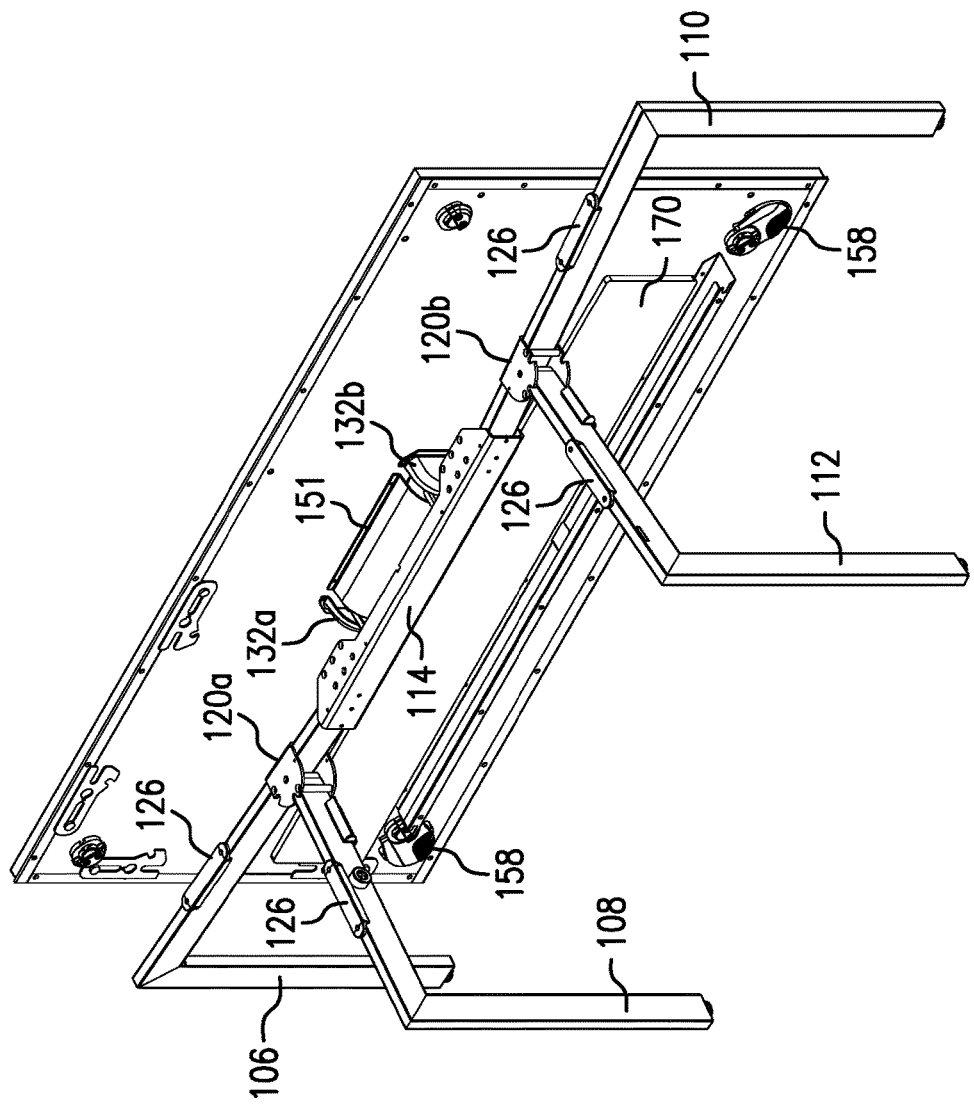
FIG. 8 is a rear perspective view of the collapsible table of FIG. 1.

As shown, for example, in FIGS. 5, 8, the tabletop 102 is articulated to the main support 114 via one or more tabletop articulations (e.g., one or more hinges) 132a, 132b, which allow the tabletop 102 to pivot relative to the main support 114 between an extended, horizontal position (shown, for example, in FIG. 5) and a collapsed position (shown, for example, in FIG. 8). The tabletop hinges 132a, 132b may articulate vertically while the primary and secondary hinges 118a,118b,120a,120b articulate horizontally. In some embodiments, the tabletop hinges 132a, 132b, the primary hinges 118a,118b, and the secondary hinges 120a,120b are located in an upper region of the table 100, near the tabletop 102. In some embodiments, the primary legs 106,108 articulate about the main support via primary hinges 118a,118b in a rearward direction; the tabletop 102 articulates about the main support 114 via tabletop hinges 132a,132b in the rearward direction (e.g., so to collapse adjacent to a front side of primary legs 106, 110), and the secondary legs articulate via secondary hinges 120a,120b in a forward direction (e.g., so to collapse adjacent to a rearward side of primary legs). The rearward direction is opposite of the forward direction, so the primary legs 106, 110 are positioned in between the collapsed tabletop 102 and the collapsed secondary legs 108, 112.

As shown in FIGS. 14 and 15, when the tabletop 102, the primary legs 106,110 and secondary legs 108,112 are in their collapsed positions, the table 100 forms a compact, layered structure that is relatively expansive in height and width and is relatively substantially more narrow in depth.

As shown in FIGS. 9 and 10, the primary hinges 118a, 118b are each formed by a bracket 130 and an aperture 128 extending therethrough. The primary legs 106,110 each includes a protrusion 131 that is configured to extend through the aperture 128 to create a pivotal engagement. In the embodiment shown in FIG. 9, the brackets 130 comprise a portion of the main support 114 and are formed integrally with the main support 114. In other embodiments, however, the bracket 130 and the main support 114 can be separate components. As shown in FIG. 10, in some embodiments, one or more of the primary hinges 118a,118b includes a bumper 132 for arresting the movement of the primary leg 106,110.

The table 100 includes a hinge lock 131 that releasably locks the secondary legs 108,112 into place in their extended and/or collapsed position, relative to the primary legs 106, 110. Locking the secondary legs 108,112 into place in their extended position improves the structural stability of the tabletop as it prevents inadvertent movement of the legs 108,112. Locking the secondary legs 108,112 into place in their collapsed position facilitates handling and storage of the table 100. For example, it prevents the secondary legs 108,112 from accidentally rotating away from the primary leg, and hitting a person and/or object, resulting in injury thereto. Also, locking the secondary legs 108,112 into place in their collapsed position maintains the table 100 in its collapsed position, so that it can be easily stored and transported, for example, on a dolly or cart, as discussed with reference to FIGS. 29A and 29B. The hinge lock 131 can be provided adjacent to or integral with the secondary hinges 120a,120b.

In the embodiment shown in FIGS. 1-23, the hinge lock 131 includes a spring-loaded latch 132 and a base 146. The hinge lock 131 is formed integrally with the secondary hinges 120,120b, as the secondary hinges 120a, 120b each includes a base 146 and a pivot pin 147. In this embodiment, the base 146 is fixedly attached to the primary leg 106,110, and the secondary leg 108,112 pivots thereabout via pivot pin 147. In other embodiments, a base 146 can be fixedly attached to a respective secondary leg 108,112, with the primary leg 106,110 pivotable thereabout. As seen in FIGS. 15-17, the base 146 includes first and second notches 159a,159b, corresponding respectively to a secondary leg's 108,112 extended and collapsed positions. The spring-loaded latch 152 extends along each secondary leg 108,112, the spring-loaded latch 152 having a protrusion 157 and a gripping portion 161. When the secondary leg 108, 112 is in its extended position, the protrusion 157 engages the first notch 159a to preclude unintended movement of the leg 108, 112. A user can then unlock and move the secondary leg 108, 112 by gripping the gripping portion 161 and pulling the latch 152 outward, away from the notch 159a, to release the protrusion 157 from the notch 159a. The user can then move the leg 108, 112 toward the respective primary leg 106,110 to collapse the secondary leg 108,112. When the secondary leg 108,112 is in the collapsed position, the protrusion aligns with the second notch 159b. Thus, when moving the secondary leg 108,112 into the collapsed position, the user can release the latch 152 so that the protrusion engages the second notch 159b, to thus lock the secondary leg 108,112 in the collapsed position. Then, when the user wishes to move the secondary leg 108,112 back into the extended position, the user can again grip the gripping portion 161 to move the protrusion 157 out of the second notch 159b, then move the leg 108,112 into the extended position, and release the latch so that the protrusion 157 engages the first notch 159a.

Referring to FIG. 8, one or more legs 106,108,110,112 includes a bushing 126 that facilitates the leg 106,108,110, 112 to slide beneath the tabletop 102. For example, the top surface of the bushing 126 can be made of a material that provides a low coefficient of friction between the top surface of the bushing 126 and the contacting undersurface of the tabletop 102. As shown in FIGS. 12 and 17, the bushing 126 can extend above the leg 106,108,110,112 at a height that is substantially the same as that of the main support 114 above the leg 106,108,110,112. Thus, the bushing 126 compensates for the added height of the main support 114 to facilitate the moving of the one or more legs 106, 108, 110, 112.

Figure 13:
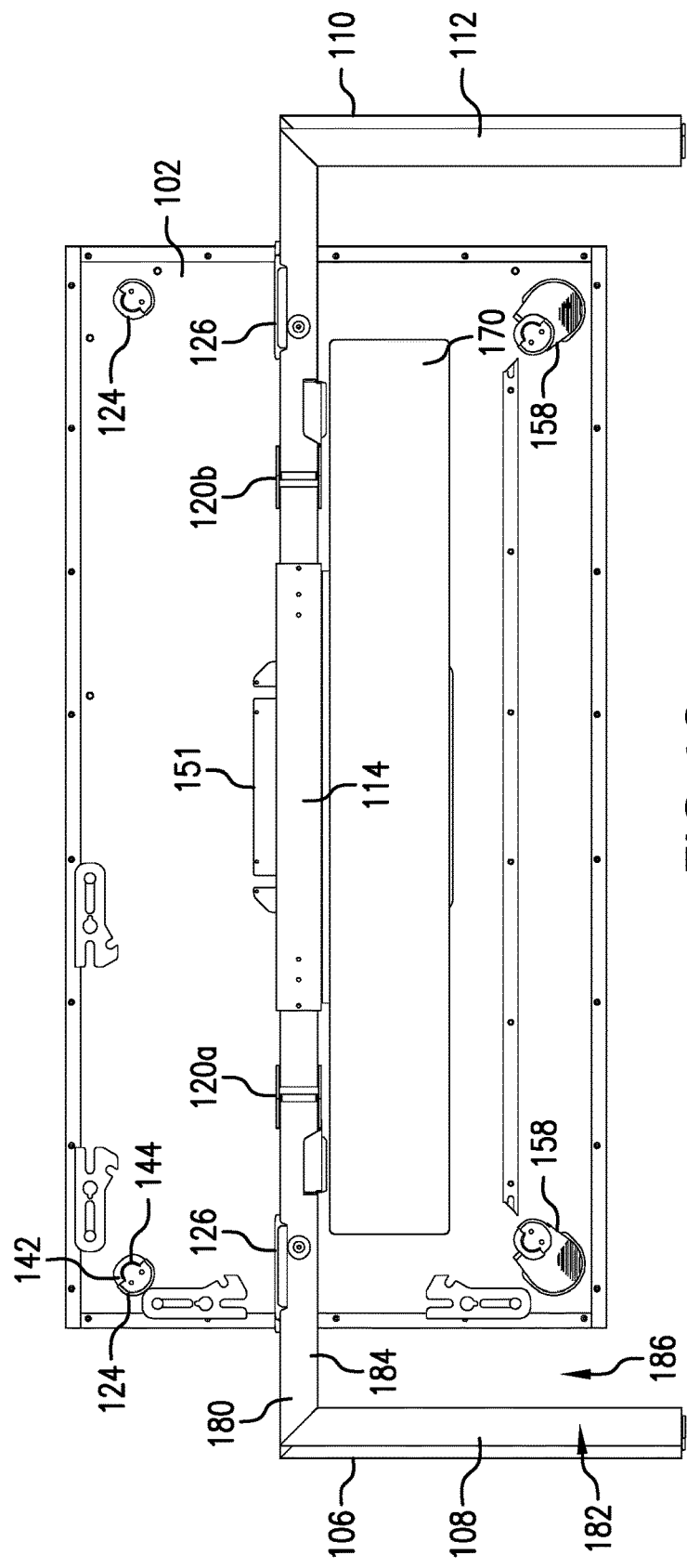
FIG. 13 is a rear view of the collapsible table of FIG. 1.
Figure 18:
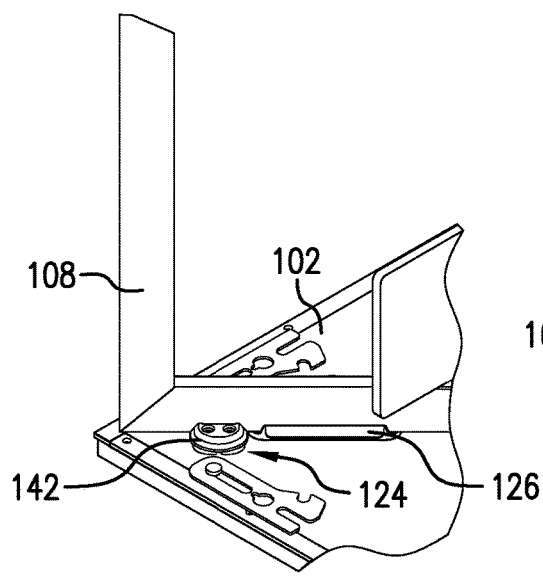
FIGS. 18-21 are views of portions of the collapsible table of FIG. 1.
Figure 19:
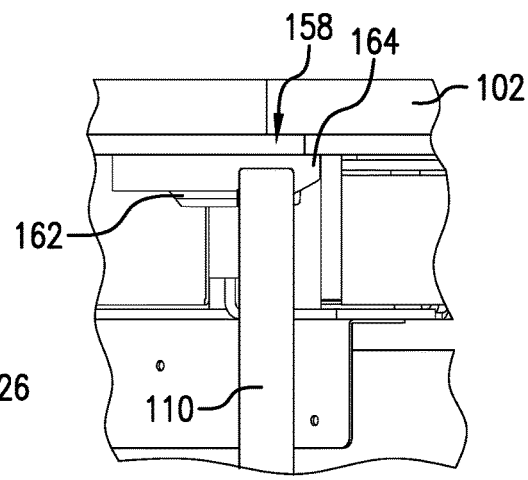
Figure 20:
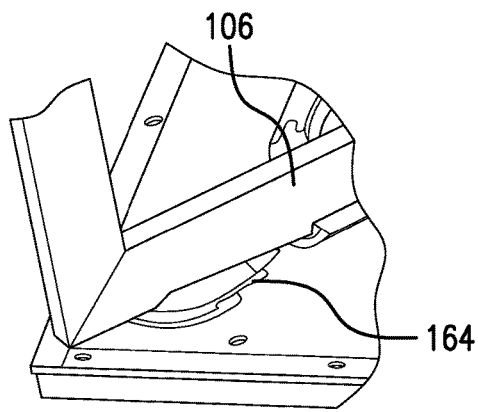
Figure 21:
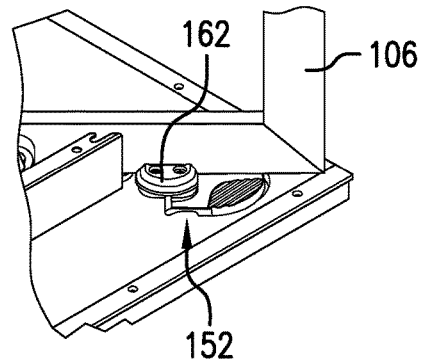

Referring to FIGS. 13 and 18, the table 100 can include at least one stop 124 for stabilizing a leg 106,108,110,112. FIGS. 13 and 18 show a stop 124 provided on an underside of the tabletop 102. In the embodiment shown in FIGS. 1-23, two stops 124 are provided for arresting motion of the first and second secondary legs 108, 112. The stop 124 includes a wall 144 to arrest the motion of a component of the foldable support 104. For example, the stop 124 can be placed such that when a leg 106,108,110,112 is in its extended position, the wall 144 of the stop restrains the leg's motion from any further extension. The stop 124 includes a tongue 142 that is insertable within an aperture of the leg 108,112. Thus, when the leg 108,112 is in its extended position, the tongue 142 protrudes through the aperture of the leg 108,112 to restrain the tabletop 102 from pivoting upwards relative to the collapsible support 104 (e.g., so the tabletop 102 cannot be lifted off of the leg 108,112). While FIGS. 1-23 show an embodiment in which the tongue 142 is integral with and extends from the wall 144, in other embodiments the tongue 142 can be separate from the wall 144. In some embodiments, when the tabletop 102 is in its horizontal position, the tongue 142 extends below the top of the leg 108,112 so that the tongue 142 is horizontally aligned with the aperture within the respective leg 108,112.

Referring now to FIGS. 13 and 19-23, the table 100 can include at least one tabletop tie-in 158 for stabilizing a leg 106,108,110,112. In the embodiment shown in FIGS. 1-23, two tabletop tie-ins 158 are provided for arresting motion of the first and second secondary legs 106,110. As seen in FIGS. 19-23, the tabletop tie-ins 158 include a back stop 162 for arresting the pivotal movement of a leg 106,110 to prevent leg 106,110 from extending further than its intended extended position. In some embodiments, a catch is configured to limit or prevent the tabletop 102 from lifting vertically off of the collapsible support 104. In some embodiments, the catch includes a tongue 160 that is insertable within an aperture 161 of the leg 106, 110. Thus, when the leg 106, 110 is in its extended position, the tongue 160 protrudes through the aperture of the leg 106, 110 to restrain the tabletop 102 from pivoting upwards relative to the collapsible support 104 (e.g., so the tabletop 102 cannot be lifted off of the leg 106, 110). While FIGS. 1-23 show an embodiment in which the tongue 160 is integral with and extends from the back stop 162, in other embodiments the tongue 160 can be separate from the back stop 162. In some embodiments, when the tabletop 102 is in its horizontal position, the tongue 160 extends below the top of the leg 106, 110 so that the tongue 160 is horizontally aligned with the aperture 161 within the respective leg 106, 110.

In the embodiment shown in FIGS. 1-23, the tie-in 158 includes a front stop 164. While FIGS. 1-23 show front stop 164 and back stop 162 that make up an integral unit, in other embodiments, the front stop 164 and back stop 162 can be separate components. A leg retaining region 170 extends between the front stop 164 and back stop 162. The width of the leg retaining region 170 is substantially the same as but slightly larger than the width of the leg 106, 110, in order to restrain motion of the leg 106, 110 when it is positioned within the leg retaining region 170.

In the embodiment shown in FIGS. 1-23, the tabletop 102 has a clearance recess 167 within its undersurface, and the back stop 164 is disposed beneath the clearance recess 167. A biased member 166 (e.g., spring) attaches to the tabletop, for example, to an upper wall of the clearance recess 167. The biased member 166 attaches to the front stop 164 to cause the front stop 164 to be biased in an outer direction, towards an outside of the recess 167. When the biased member 166 is in its biased position, the front stop 164 is disposed so that it restrains the pivotal movement of the leg 106,110, preventing the leg 106,110 from moving inwards towards it collapsed position. Thus, when the biased member is in its biased position and the leg 106,110 is within the leg retention region 170, the front stop 164 and the back stop 162 restrain the pivotal movement of the leg 106,110.

Figure 22:
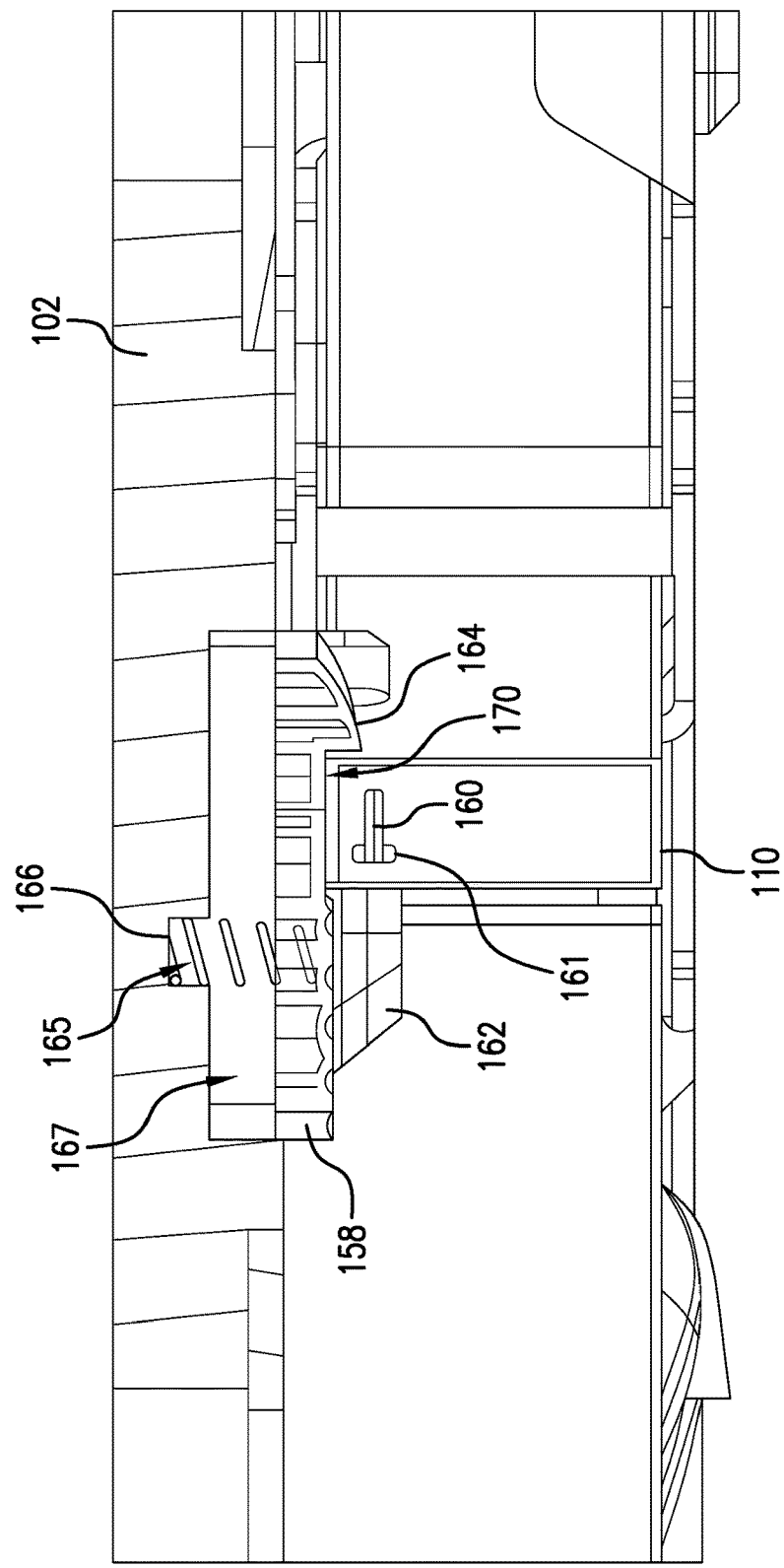
FIG. 22 is a cross-sectional view of a portion of the collapsible table of FIG. 1.
Figure 23:
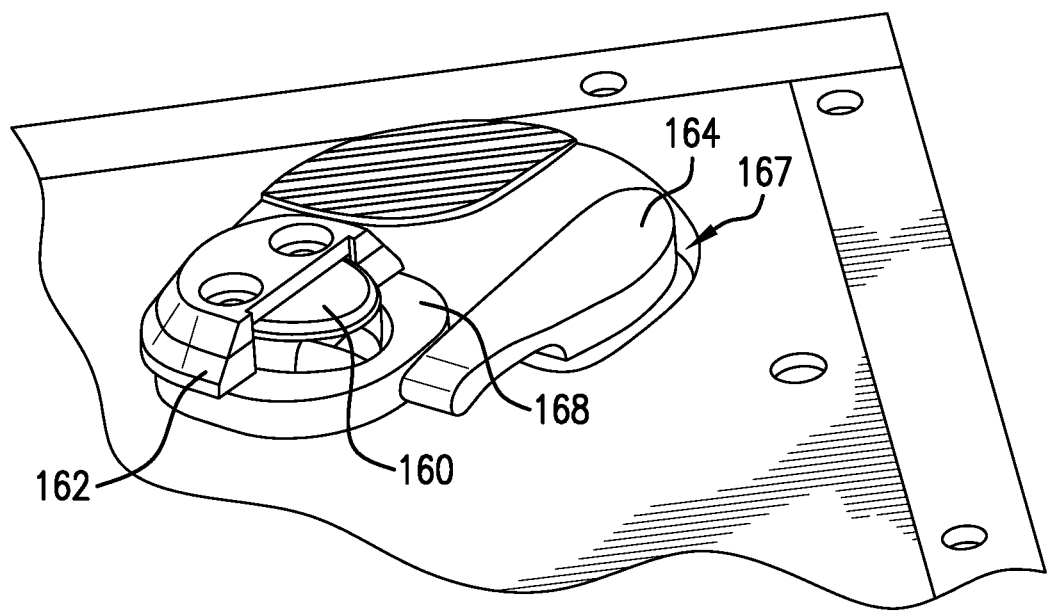
FIG. 23 is a perspective view of a portion of the collapsible table of FIG. 1.

When a user moves the leg 106,110 from a collapsed position to an extended position, the leg 106,110 exerts force on the back stop 164, causing the biased member 166 to bend or flex into the recess 167 and allow the leg 106,110 to move across the leg back stop 164 towards the wall 162. As shown in FIG. 22, the back stop 164 can be have an angled surface to facilitate the leg 106,110 in sliding over it. When the leg 106,110 slides beneath the tabletop 102 into an extended position, the leg 106,110 slides beneath angled back stop 164 to push the back stop 164 into the clearance recess 167. The biased member 166 is compressed toward the upper wall 168. In some embodiments, the biased member 166 is a spring and the clearance recess 167 includes a cut-out 166 that is dimensioned to fit the compressed spring 166. Thus, as the leg 106,110 slides across the ramp surface 164, the spring 166 is compressed within the cut-out 166. The clearance recess 167 is dimensioned to allow the back stop 164 to be disposed within the clearance recess 167 enough to allow the leg 106,110 to slide thereneath.

The collapsible table 100 is configured such that when the leg 106, 110 abuts the stop 162, the leg 106,110 is in its extended position. The biased member 166 thus flexes towards the outer direction, back to its biased position. When the leg 106,110 is in its extended position, the leg 106,110 fits within the leg retaining region 170, between the front stop 162 and back stop 164, which thereby restrain the motion of the leg 106,110.

In some embodiments, the table 100 includes a structure for providing support to the tabletop 102 and preventing the tabletop 102 from freefalling when at least a portion of the collapsible support 104 is in a collapsed position. For example, the table 100 can include a tabletop spring and/or a damper. As shown in phantom lines in FIG. 7, a gas-assist shock 148 may be provided for this purpose. The support (e.g., gas-assist shock 148) can be covered by a shroud 150.

As shown in FIG. 1, the collapsible support 104 includes at least one tabletop stiffener 116. The tabletop stiffener 116 can be coupled to the tabletop 102, preferably, to the underside, to improve the stability and rigidity of the tabletop 102. The tabletop stiffener 116 can also act as a stopper to arrest the motion of another component of the collapsible support 104. For example, as shown in FIG. 1, the tabletop stiffener 116 arrests the motion of the first and second primary legs 106,110. When the first and second primary legs 106,110 is each in its extended position, one end of the tabletop stiffener 116 can contact the first primary leg 106 and another end of the tabletop stiffener 116 can contact the second primary leg to limit the pivoting motion thereof.

As shown in FIGS. 1-4, 6-15 in some embodiments, the collapsible table 100 can include a modesty panel 170. In the embodiment shown in FIGS. 1-4, 6-15, the modesty panel 170 extends from and is mounted to the main support 114. In alternate embodiments, the modesty panel 170 can be mounted to other parts of the table 100. In embodiment shown in FIGS. 1-4, 6-15, the modesty panel 170 can articulate about the main support 114, so that the modesty panel 170 can collapse and lie substantially flush with the tabletop 102 (as shown, for example, in FIG. 14).

Figure 24:
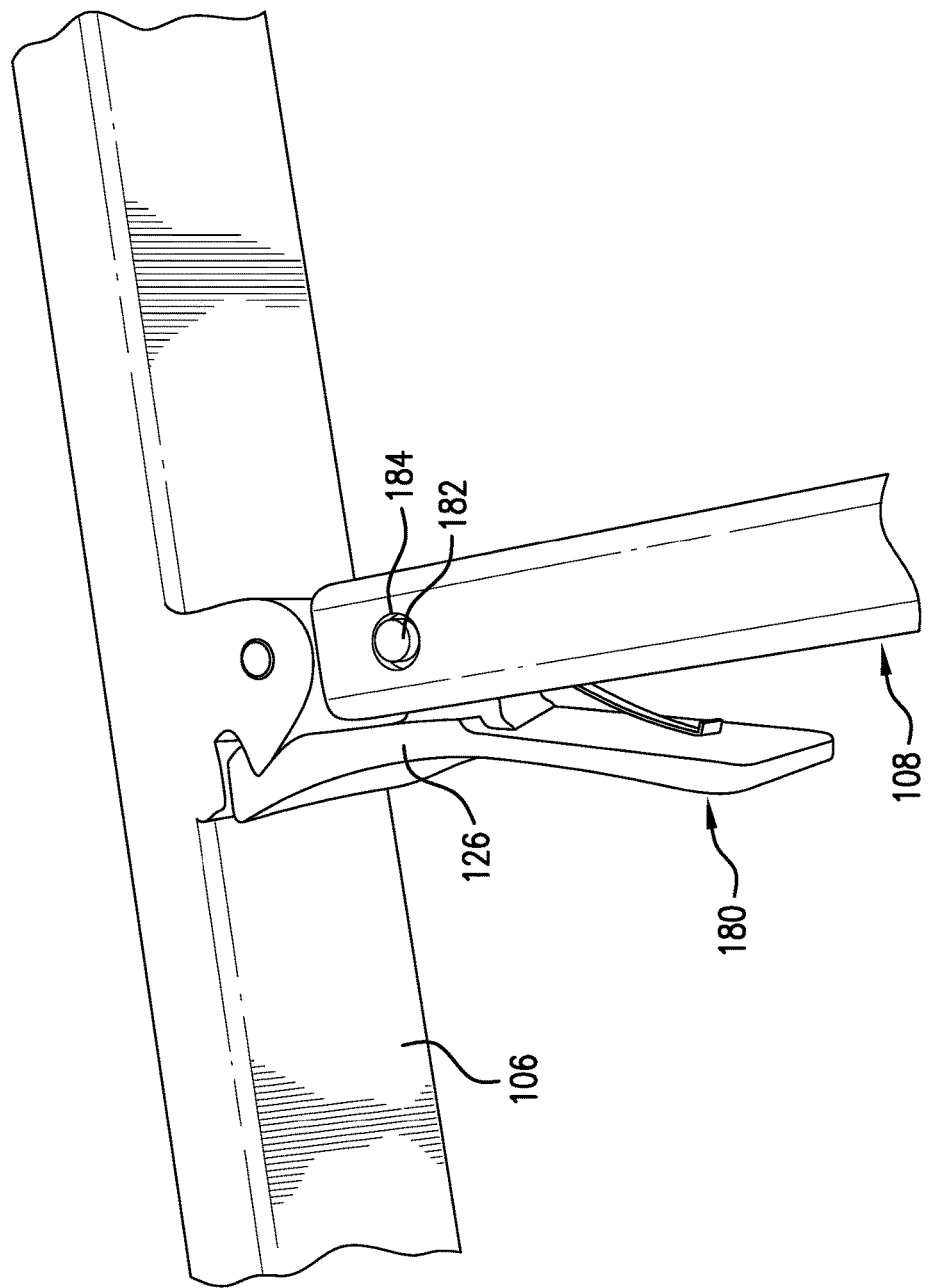
FIG. 24 shows a locking mechanism, according to an embodiment.
Figure 25:
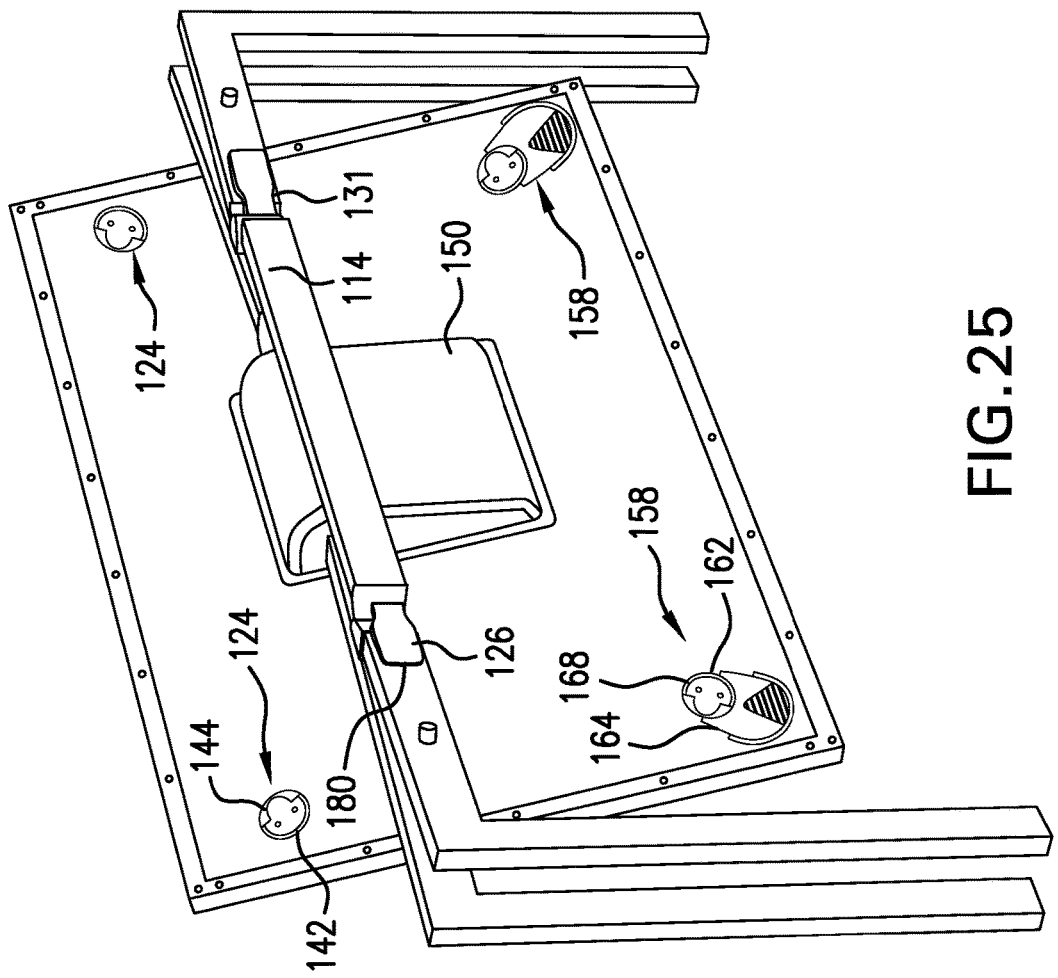
FIG. 25 shows a collapsible table including a locking mechanism, according to an embodiment.

FIGS. 24 and 25 show another embodiment of a hinge lock 131. In this embodiment, the secondary leg 108,112 includes has an aperture 182 extending therethrough, and the lock 131 includes a lever 180 connected to a protrusion 184. In an unlocked position (e.g., when the secondary leg 108,112 is in a collapsed position), the protrusion 184 is located outside of the aperture 182. When moving the secondary leg 108,112 into its extended position, the secondary leg 108,112 can slide over the protrusion 184 until the protrusion 184 extends out of the aperture 182 and is thus locked into place. In order to unlock the lock 131 (e.g., to allow the secondary leg 108,112 to articulate to its collapsed position), a user can push the lever 180 inward toward the secondary leg 108,112, and slide the protrusion 184 outward from the aperture 182.

Figure 26:
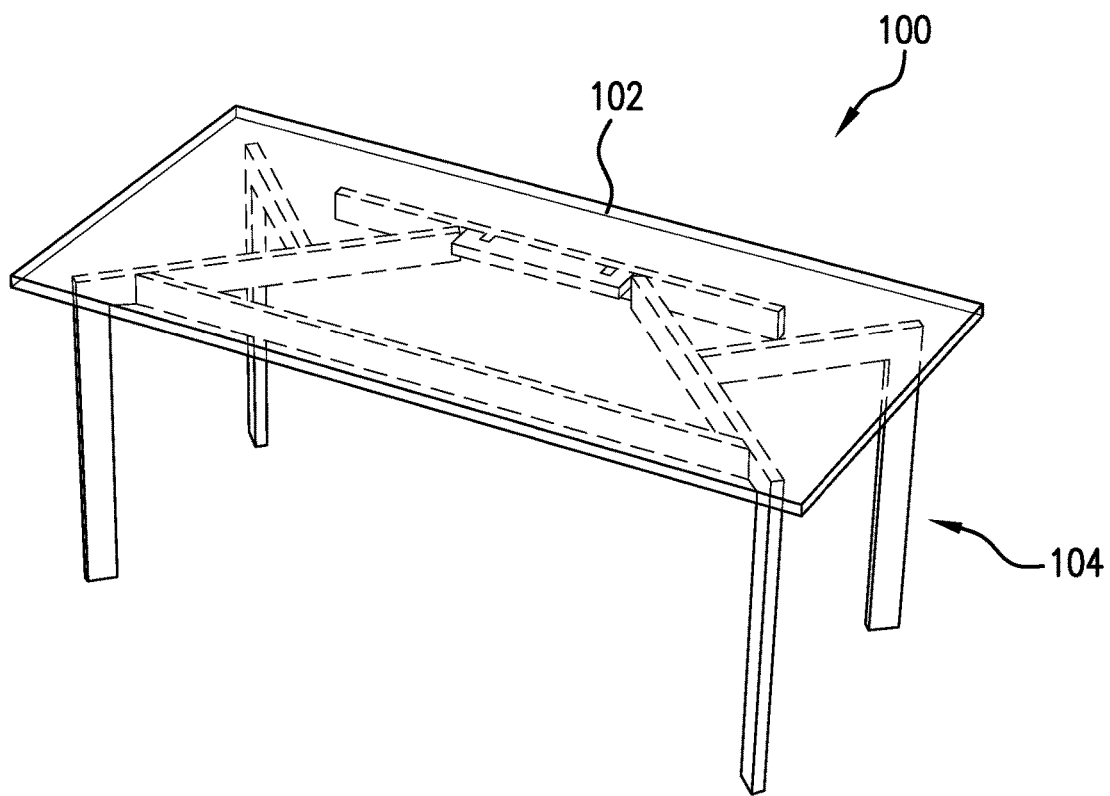
FIG. 26 is a perspective view of a collapsible table, according to an embodiment.
Figure 27:
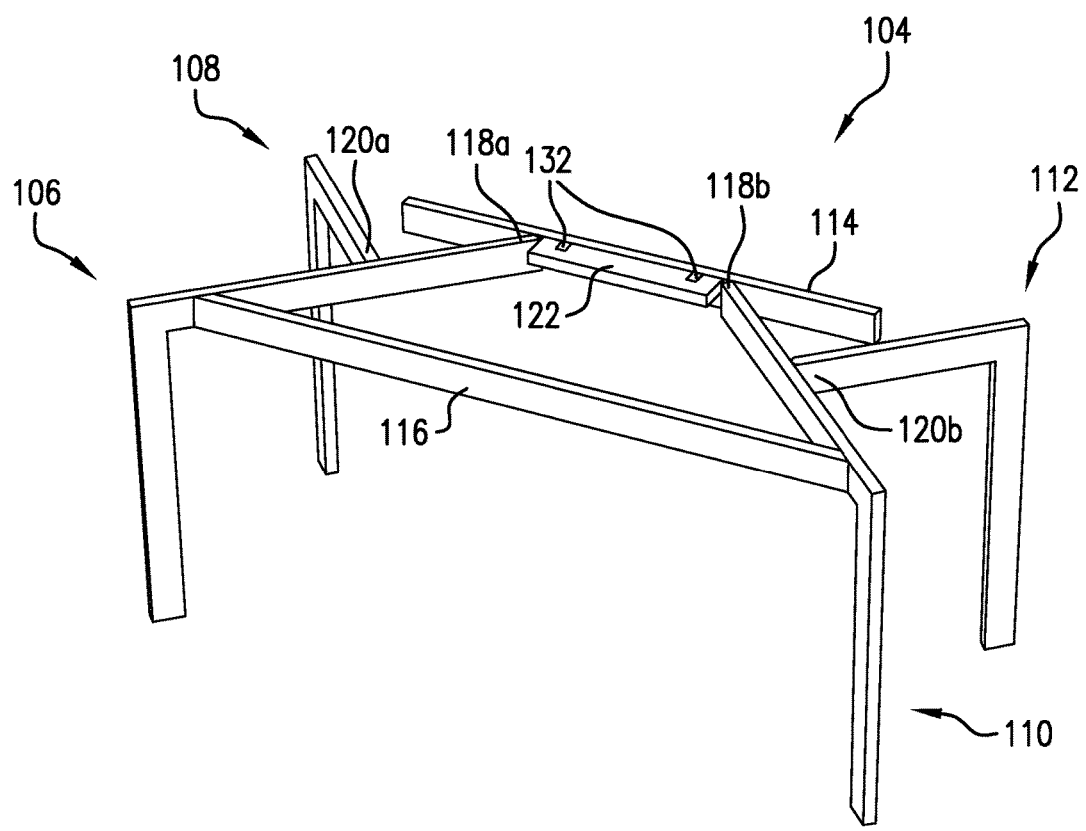
FIG. 27 is a perspective view of the collapsible table of FIG. 26, with the tabletop omitted for purposes of illustration.

FIGS. 26-28 show another embodiment of a collapsible table 100. As shown in FIG. 28F, in this embodiment, when the table 100 is in its collapsed position, the table 110 can form a structure with three layers, and each of the three layers can extend in planes parallel to one another. When the secondary leg is collapsed, the main support 114 is substantially collinear with the secondary leg. When the tabletop 102 is collapsed, it can be flush with a surface on the main support 114. When the primary and secondary legs are also collapsed, the primary and secondary legs can each have a surface substantially parallel to the surface on the main support.

FIG. 28A shows the table 100 with all of the primary legs 106,110 and secondary legs 108, 112 in an extended position. In FIG. 28B, the primary legs 106, 110 are moved towards a collapsed position. In FIG. 28C, the primary legs 106, 110 are each in their retracted position. In this embodiment, a portion of each primary leg 106,110, is flush with the main support 114. In FIG. 28D, the tabletop 102 is articulated to its collapsed position. As shown in FIG. 28E, when the tabletop 102 is in its collapsed position, then the tabletop 102, main support 114, and primary legs 106, 110 can form a compact structure, with the secondary legs 108, 112 extending therefrom. In FIG. 28F, the table 100 is in its collapsed position, and the table 110 forms a structure with three layers lying substantially flush with one another, and each of the three layers can extend in planes parallel to one another.

Figure 29A:
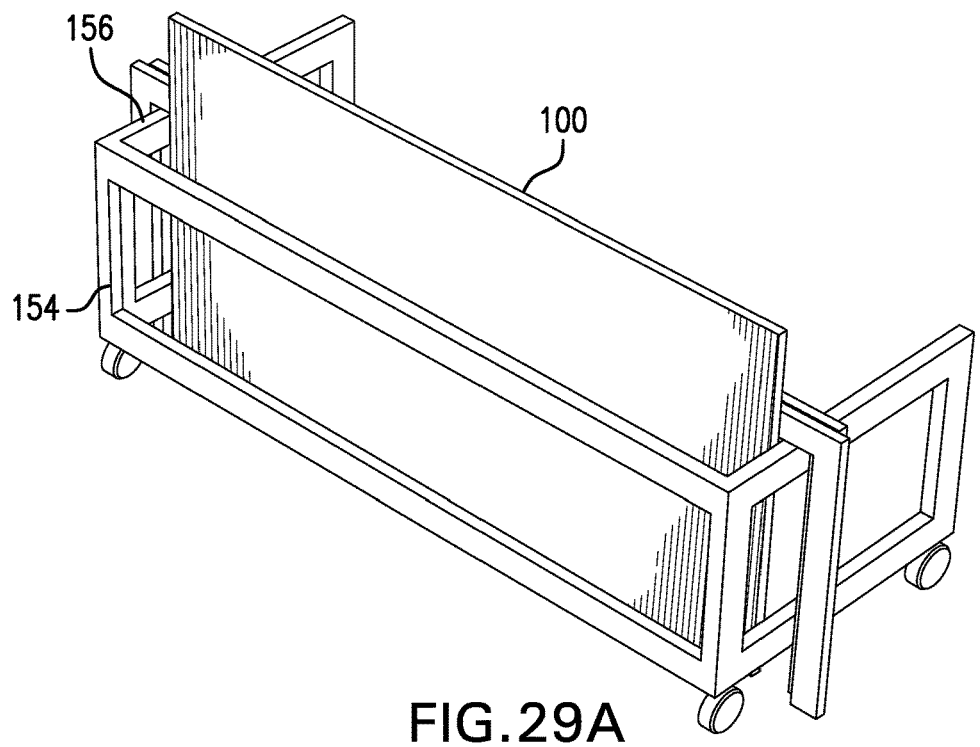
FIGS. 29A and 29B are perspective views of the collapsible table of FIG. 26 as it is loaded onto a dolly.
Figure 29B:
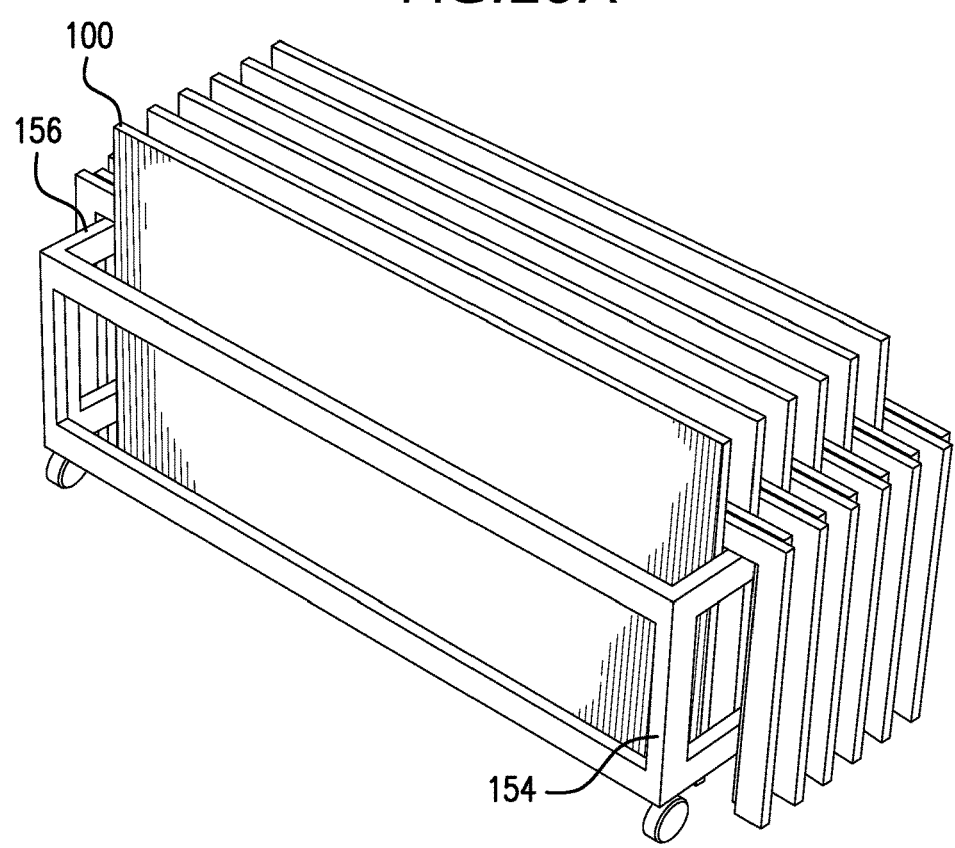

As shown in FIGS. 29A and 29B, when the table 100 is in a collapsed configuration, a user can load the table 100 onto a dolly or cart 154. When in their collapsed configuration, one or more of the legs 106, 108,110,112 may extend laterally beyond one or more edges of the tabletop 102, to rest on a portion (e.g., a rail 156) of a cart or dolly 154. The legs 106, 108, 110, 112 can extend over and rest upon at least one rail 156 of the dolly 154. The rail 156 can extend between the tabletop 102 and the legs 106,108,110,112 on each side of the tabletop. For example, as shown in FIG. 13, in preferred embodiments, the legs 106,108,110,112 each have a support arm 180 and a vertical leg 182 extending therefrom. The support arm 180 can extend substantially horizontally, and the vertical leg 182 can extend substantially vertically, and the support arm 180 and vertical leg 182 form a substantially perpendicular angle. When the table 100 is in the collapsed position, there is a space 186 between the tabletop 102 and the legs 106,108,110,112. The table 100 can thus be loaded onto a dolly 154 so that the rails 156 rest on the lift points 184 on the support arms 180. As seen in FIG. 29B, multiple collapsed tables 100 can be loaded onto a dolly 154 and transported together.

While the above discussion focuses on embodiments in which the collapsible furniture article is a collapsible table, other furniture articles are envisioned. For example, the collapsible furniture article could be a stool or a bench. FIG. 1 is a bottom view of a collapsible table 100 according to an embodiment. The table 100 includes a tabletop 102 and a collapsible support 104. Also, while in the herein shown embodiments, the tabletop 102 is a rectangular, planar surface, those in the art will appreciate that the tabletop 102 can have alternate shapes and configurations while remaining with the scope of this disclosure. Also, while in the above described embodiments, the furniture article includes two primary legs and two secondary legs, in other embodiments, the article can have only one primary leg and one secondary leg, or other suitable numbers of primary and secondary legs while remaining within the scope of this disclosure.

What is claimed is:

1. A collapsible furniture article, comprising:
a horizontal support surface articulates about a main support between an extended position and a collapsed position with respect thereto;
a first primary leg that is pivotally connected to the main support such that the first primary leg pivots between an extended position and a second position with respect thereto; and
a first secondary leg that depends from and is pivotally connected to the first primary leg such that the first secondary leg pivots between an extended position and a second position with respect thereto;
wherein when the first primary leg and the first secondary leg are in the extended position, they are disposed to support the horizontal support surface in a horizontal position.

2. The collapsible furniture article of claim 1, wherein:
the first primary leg pivots from the extended position to the second position in a rearward direction,
the horizontal support surface pivots from the extended position to the second position in the rearward direction, and
the first secondary leg pivots from the extended position to the second position in a forward direction that is opposite the rearward direction.

3. The collapsible furniture article of claim 1, further comprising:
a second primary leg connected to the horizontal support surface pivotally between a second position and an extended position with respect thereto; and
a second secondary leg that depends from and is pivotally connected to the second primary leg such that it pivots between a second position and an extended position.

4. The collapsible furniture article of claim 3, wherein:
the horizontal support surface has a width extending from a first end to a second end; and
in the second position, the first primary and secondary legs extend widthwise past the first end, and the second primary and secondary legs extend widthwise past the second end.

5. The collapsible furniture article of claim 3, wherein the second position of the first primary leg, second primary leg, first secondary leg and second secondary leg are positions configured to facilitate storage of the collapsible furniture article.

6. The collapsible furniture article of claim 3, wherein the first primary leg and the second primary leg articulate relative to the main support independent of each other.

7. The collapsible furniture article of claim 1, wherein:
the primary leg is pivotally connected with the main support about a first axis allowing the primary leg to pivot between the second and extended position with respect to the horizontal support surface; and
the horizontal support surface pivots from the main support between a horizontal position and a collapsed vertical position about a second axis.

8. The collapsible furniture article of claim 1, wherein in a horizontal position, the horizontal support surface rests on both primary and secondary legs.

9. The collapsible furniture article of claim 8, wherein the horizontal support surface is operable to be positioned in the horizontal position or vertical position when the first primary leg is in the second position.

10. The collapsible furniture article of claim 1, wherein the primary legs are positioned between the collapsed support horizontal surface and the collapsed secondary legs in the collapsed position.

11. The collapsible furniture article of claim 1, wherein the first primary leg includes a horizontal portion and a vertical portion and the first primary leg rotates about a hinge located at a horizontal end of the primary leg proximate the main support.

12. The collapsible furniture article of claim 1, wherein the first primary leg rotates about a single pivot directly connected to the main support and the first secondary leg rotates about a single pivot directly connected to the primary leg.

13. A collapsible table comprising:
a tabletop;
a first primary leg that is connected to the tabletop and that pivots between a collapsed position and an extended position with respect to the tabletop; and
a first secondary leg that is connected to and pivots with respect to the first primary leg between a collapsed position and an extended position;
wherein the first primary leg and the first secondary leg, in the extended position, are disposed to support the tabletop in a horizontal position, and the first primary leg and the first secondary leg, in the collapsed position, are folded occupying a smaller volume than in the extended position; and
wherein the first primary leg pivots from the extended position to the collapsed position in a first direction, the tabletop pivots from the extended position to the collapsed position in the first direction, and the first secondary leg pivots from the extended position to the collapsed position in a second direction that is opposite the first direction.

14. The collapsible table of claim 13, further comprising:
a second primary leg connected to the table top pivotally between a collapsed position and an extended position with respect thereto; and
a second secondary leg that is connected to and pivots with respect to the second primary leg pivotally between a collapsed position and an extended position.

15. The collapsible table of claim 14, wherein:
the tabletop has a width extending from a first end to a second end; and
in the collapsed position, the first primary and secondary legs extend widthwise past the first end, and the second primary and secondary legs extend widthwise past the second end.

16. The collapsible table of claim 13, wherein
the primary leg is pivotally connected with the tabletop about a first axis allowing the primary leg to pivot between the collapsed and extended position with respect to the tabletop; and
the tabletop pivots between a horizontal position and a collapsed vertical position about a second axis.

17. The collapsible table of claim 13, wherein in a horizontal position, the tabletop rests on both primary and secondary legs.

18. The collapsible table of claim 13, wherein the tabletop is operable to be positioned in the horizontal position or vertical position when the first primary leg is in the collapsed position.

19. A collapsible furniture article, comprising:
a horizontal support surface that articulates about a main support between an extended position and a collapsed position with respect thereto;
a first primary leg that is connected to the main support and that pivots between an extended position and a collapsed position with respect thereto; and
a first secondary leg that is pivotally connected to the first primary leg such that the first secondary leg pivots between an extended position and a collapsed position with respect thereto;
wherein the first primary leg and the first secondary leg, in the extended position are disposed to support the horizontal support surface in a horizontal position, and the first primary leg and the first secondary leg, in the collapsed position, are folded occupying a smaller volume than in the extended position; and
wherein, in the collapsed position, the first primary leg is positioned between the collapsed support horizontal surface and the collapsed first secondary leg.

20. A collapsible furniture article, comprising:
a horizontal support surface;
first and second primary legs that are connected to the tabletop and that pivot between a collapsed position and an extended position with respect thereto;
a secondary leg that is pivotally connected to at least one of the first primary leg or the second primary leg such that the secondary leg pivots between a collapsed position and an extended position;
wherein the legs in the extended position are disposed to support the tabletop in a horizontal position, and the legs in the collapsed position are folded generally parallel with each other collectively occupying a smaller volume than in the extended position.

21. The collapsible furniture article of claim 20, further comprising:
a ramp on the horizontal support surface that can be deflected by one of the primary legs or the secondary leg when the primary or secondary leg slides along the underside of the horizontal surface; and
a vertical retention element that engages the primary or secondary leg to prevent the horizontal support surface from lifting away from the primary or secondary leg.

22. A collapsible furniture article, comprising:
a horizontal support that articulates about a main support between an extended position and a collapsed position with respect thereto;
a primary leg that is connected to and pivots relative to the main support around a first axis between an extended position and a collapsed position; and
a secondary leg that is connected to and pivots relative to the primary leg around a second axis between an extended position and a collapsed position;
wherein the legs in the extended position are disposed to support the horizontal support surface in a horizontal position.

\* \* \* \* \*